No. 801,590. PATENTED OCT. 10, 1905.
J. HOOPER.
WRENCH.
APPLICATION FILED JUNE 15, 1905.
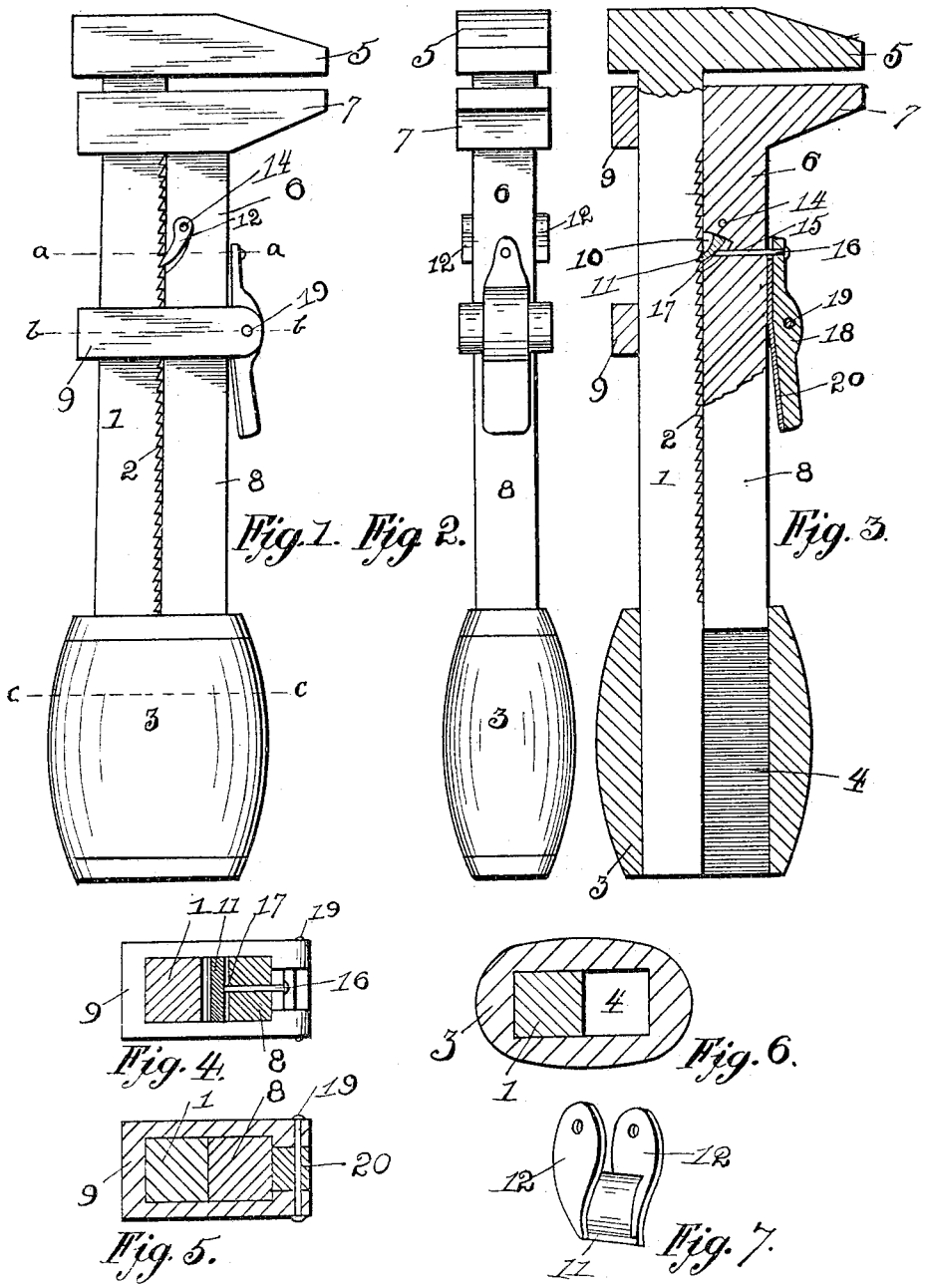

UNITED STATES PATENT OFFICE.

JOHN HOOPER, OF HAZZARD, PENNSYLVANIA.

WRENCH.

No. 801,590.    Specification of Letters Patent.    Patented Oct. 10, 1905.

Application filed June 15, 1905. Serial No. 265,399.

*To all whom it may concern:*

Be it known that I, JOHN HOOPER, a citizen of the United States of America, residing at Hazzard, in the county of Washington and State of Pennsylvania, have invented certain new and useful Improvements in Wrenches, of which the following is a specification, reference being had therein to the accompanying drawings.

This invention relates to certain new and useful improvements in wrenches; and the invention relates more particularly to that type of wrench commonly known as a "monkey-wrench."

The object of the invention is to provide a wrench of the above type that can be easily and quickly manipulated to grip an object, as a nut.

Another object of this invention is to provide a wrench which will be extremely simple in construction, strong and durable, comparatively inexpensive to manufacture, and highly efficient for the purposes for which it is intended.

Briefly described, my improved wrench comprises a serrated shank, carrying a handle and a fixed jaw. The handle of the shank is provided with a vertically-disposed opening in which the shank portion of a movable jaw is mounted, and this shank portion of said movable jaw is provided with straps to embrace the shank carrying the fixed jaw. The shank of the movable jaw is also provided with a spring-lever or finger-piece, which is employed to manipulate a pawl or dog pivotally connected to the shank of the movable jaw and adapted to engage the teeth of the serrated shank carrying the fixed jaw.

The above construction will be more fully described and then specifically pointed out in the claim, and, referring to the drawings accompanying this application, like numerals of reference designate corresponding parts throughout the several views, in which—

Figure 1 is a side elevation of my improved wrench. Fig. 2 is an edge view. Fig. 3 is a vertical sectional view. Fig. 4 is a transverse sectional view taken on the line *a a* of Fig. 1. Fig. 5 is a similar view on the line *b b* of Fig. 1. Fig. 6 is a similar view on the line *c c* of Fig. 1, and Fig. 7 is a detached detail perspective view of the pawl or dog carried by the shank of the movable jaw.

To put my invention into practice, I construct my improved wrench of a shank 1, having a serrated or toothed edge 2. The lower end of the shank 1 is provided with a substantially barrel-shaped handle 3, having a vertically-disposed opening 4 formed therein adjacent to the side of the shank 1. The upper end of the shank is provided with a fixed jaw 5.

Prior to placing the handle 3 upon the shank 1 I position a movable jaw 6 upon said shank, said movable jaw consisting of a gripping-jaw 7 and a shank 8. The shank of the movable jaw is provided with straps 9 9, adapted to embrace the shank 1 and retain said jaw in engagement with said shank. The edge of the shank 8 confronting the shank 1 is cut away, as indicated at 10, to accommodate a pawl or dog 11, which is provided with pierced side arms or wings 12 12. A pin or screw 14 is employed to retain the dog 11 within the cut-away portion 10 of the movable jaw. The shank 8 of the movable jaw is provided with a transversely-disposed opening 15, through which passes a pin 16, that is connected to the rear face of the dog 11, as indicated at 17, while the outer end of said pin is connected to a lever or finger-piece 18, which is pivotally mounted by a pin 19 between the ends of the straps 9. A leaf-spring 20 is interposed between the finger-piece 18 and the outer face of the shank 8, said spring being adapted to normally force the outer end of the finger-piece 18 outwardly, whereby to hold the pawl or dog 11 in engagement with the serrated or toothed edge of the shank 1.

To operate my improved wrench, it is only necessary to press upon the lower end of the finger-piece 18, which through the medium of the pin 16 will move the dog 11 out of engagement with the serrated or toothed edge 2 of the shank 1, permitting the jaw 6 to be moved upon the shank 1 of the wrench to the desired position, at which time by releasing the finger-piece 18 the dog will be returned to its normal position in engagement with the shank 1. The lower end of the shank 8 of the movable jaw is prevented from becoming disengaged from the shank on account of the opening or aperture 4, in which it is mounted, and when my improved wrench is used the strain and stress heretofore exerted upon the shank of an ordinary wrench is considerably relieved by the shank 8 of my improved wrench bearing entirely against the surface of the shank 1, consequently strengthening the wrench when it is being employed as a lever to rotate an object such as a nut.

It is thought from the foregoing that the construction, operation, and advantages of the herein-described wrench will be apparent without further description, and various changes in the form, proportion, and minor details of construction may be resorted to without departing from the spirit of the invention or sacrificing any of the advantages thereof.

What I claim, and desire to secure by Letters Patent, is—

In a wrench, a toothed shank having a fixed jaw at one end and a handle at its other end, said handle having an opening adjacent the shank, a movable jaw mounted on said shank, and having a shank portion extending into the opening of said handle, straps carried by the shank of the movable jaw and embracing the toothed shank, the said shank portion of the movable jaw having a cut-away portion, a pawl or dog pivotally connected to said shank and lying within said cut-away portion and adapted to engage the toothed shank, a spring-pressed finger-piece pivotally connected to the said straps, and a pin passing through the shank of the toothed jaw and having its ends connected to said pawl or dog and to the finger-piece respectively, substantially as described.

In testimony whereof I affix my signature in the presence of two witnesses.

JOHN HOOPER.

Witnesses:
WILLIAM BARRINGER,
THOMAS HIGGINS.